United States Patent
Steffey et al.

(10) Patent No.: US 11,055,426 B2
(45) Date of Patent: Jul. 6, 2021

(54) SECURING DATA ACQUIRED BY COORDINATE MEASUREMENT DEVICES

(71) Applicant: FARO Technologies, Inc., Lake Mary, FL (US)

(72) Inventors: Kenneth Steffey, Longwood, FL (US); Oswin Horvath, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 423 days.

(21) Appl. No.: 16/036,153

(22) Filed: Jul. 16, 2018

(65) Prior Publication Data
US 2020/0019717 A1 Jan. 16, 2020

(51) Int. Cl.
*G06F 21/62* (2013.01)
*G06F 21/64* (2013.01)
*H04L 9/32* (2006.01)

(52) U.S. Cl.
CPC .......... *G06F 21/6218* (2013.01); *G06F 21/64* (2013.01); *H04L 9/3239* (2013.01)

(58) Field of Classification Search
CPC ... G06F 21/6218; G06F 21/64; H04L 9/3239; H04L 63/123; H04W 12/1006; H04W 12/06
See application file for complete search history.

(56) References Cited

U.S. PATENT DOCUMENTS

| | | | | |
|---|---|---|---|---|
| 5,742,807 A | * | 4/1998 | Masinter | G06F 16/9014 707/610 |
| 5,757,915 A | * | 5/1998 | Aucsmith | G06F 21/51 713/167 |
| 7,591,022 B2 | * | 9/2009 | Carpentier | H04L 67/28 726/30 |
| 7,913,119 B2 | | 3/2011 | Hama | |
| 8,161,012 B1 | | 4/2012 | Gerraty et al. | |
| 8,386,774 B2 | | 2/2013 | Lin | |

(Continued)

FOREIGN PATENT DOCUMENTS

EP 2884689 A2 6/2015

OTHER PUBLICATIONS

"Digital Forensics Tutorials—Hashing", http://nest.unm.edu/files/1513/9251/5241/Tutorial_2_-_FTK_WinHex_-_Hashing.pdf, pp. 1-6.

(Continued)

*Primary Examiner* — Matthew Smithers
*Assistant Examiner* — Mirza Israr Javed
(74) *Attorney, Agent, or Firm* — Cantor Colburn LLP

(57) ABSTRACT

Securing data acquired by coordinate measurement devices including receiving a request from a requestor to access a data file including data that was acquired by a coordinate measurement device. The data file is retrieved and the content of the data file is authenticated. The authenticating includes retrieving an expected digital security attribute previously calculated by a digital security function based on content of the data file prior to the data file being retrieved. The authenticating also includes applying the digital security function to the data file to calculate an actual digital security attribute, and comparing the expected digital security attribute to the actual digital security attribute. Based on the comparing, a value of valid or not valid is assigned to an output of the authenticating.

35 Claims, 10 Drawing Sheets

(56) References Cited

U.S. PATENT DOCUMENTS

| | | |
|---|---|---|
| 8,488,834 B2 | 7/2013 | Honsinger et al. |
| 8,639,762 B2 * | 1/2014 | Rasmussen ........... H04L 51/043 |
| | | 709/206 |
| 9,338,013 B2 | 5/2016 | Castellucci et al. |
| 9,424,440 B2 | 8/2016 | Wilson |
| 9,754,131 B2 | 9/2017 | Wilson |
| 10,169,585 B1 * | 1/2019 | Pilipenko .............. G06F 21/566 |
| 2006/0242418 A1 | 10/2006 | Willamowski et al. |
| 2007/0283158 A1 | 12/2007 | Danseglio |
| 2009/0196425 A1 | 8/2009 | Boland |
| 2009/0199274 A1 * | 8/2009 | Frazier .................... H04L 63/08 |
| | | 726/4 |
| 2014/0081926 A1 | 3/2014 | Adams et al. |
| 2014/0304512 A1 * | 10/2014 | Kotov ...................... G06F 21/64 |
| | | 713/171 |
| 2015/0089662 A1 | 3/2015 | Zhang et al. |
| 2015/0121522 A1 | 4/2015 | Guido |
| 2015/0172050 A1 * | 6/2015 | Teuwen ............... H04L 9/0872 |
| | | 380/255 |
| 2015/0317325 A1 | 11/2015 | Key |
| 2017/0063551 A1 | 3/2017 | Quinn et al. |
| 2017/0134162 A1 * | 5/2017 | Code ....................... G06F 21/10 |
| 2018/0026790 A1 | 1/2018 | Seo et al. |
| 2020/0019717 A1 * | 1/2020 | Steffey .................. H04L 63/123 |

OTHER PUBLICATIONS

International Search Report and Written Opinion for Internation Application No. PCT/US2019/041583; International Filing Date: Jul. 12, 2019; dated Dec. 16, 2019; 17 pages.

* cited by examiner

SECURING DATA ACQUIRED BY COORDINATE MEASUREMENT DEVICES

BACKGROUND

The subject matter described herein relates in general to data security, and in particular to securing data acquired by coordinate measurement devices.

The integrity of digital data can be verified through the use of digital security functions such as cryptographic hash functions where a cryptographic hash function is applied to contents of a file to calculate a digital security attribute, such as a hash code, for the file. A user subsequently accessing the file can verify that contents of the file have not been altered, modified, or corrupted by applying the same cryptographic hash function to the file, or to a copy of the file, to calculate a new hash code, or other digital security attribute, which is compared to the original hash code. If the new hash code matches the original hash code then the file has not been altered. With 3D scan data and other digital assets now being used in public safety applications, cryptographic hash functions can be used to assure that the information gathered at the scene is not altered during the process of the investigation.

Typically, file authenticity is confirmed using a cryptographic hash function when a file has been copied and moved to a destination computer. Once authenticity is confirmed, the user can open the file and execute the required processes and analysis with the data in the file. Users following best practices will check the hash code every time that the file is loaded or opened in order to be confident that someone did not tamper with the data in the file since the last time they worked with the file and/or that it was transferred or copied to a new destination without errors. The process of checking the hash code is not integrated into a user's workflow so it is more likely to be skipped as it provides a burden on the user to ensure that it is completed. This process can be cumbersome and time consuming, and oftentimes after the file is checked once on a computer the user generally trusts that is has not changed. Contemporary tools are not available to verify that any purposeful changes to the asset were documented, or logged, and that only desired and verifiable changes are included in the new version of the digital asset.

In the area of public safety and cases that end up going to trial it is important that the user follow the best practices of checking the hash code each time that they access the file. The steps taken to ensure file integrity of scans and digital evidence assets throughout the investigative period should be carefully documented to ensure that the evidence presented can withstand scrutiny during cross examination and questions from expert witnesses.

Accordingly, while data security processes are suitable for their intended purposes, what is needed is a data security process having certain features of embodiments of the present invention.

BRIEF DESCRIPTION

According to an embodiment of the present invention, a method for securing data acquired by coordinate measurement devices is provided. The method includes receiving a request from a requestor to access a data file including data that was acquired by a coordinate measurement device. The data file is retrieved and the content of the data file is authenticated. The authenticating includes retrieving an expected digital security attribute previously calculated by a digital security function based on content of the data file prior to the data file being retrieved. The authenticating also includes applying the digital security function to the data file to calculate an actual digital security attribute, and comparing the expected digital security attribute to the actual digital security attribute. Based on the comparing, a value of valid or not valid is assigned to an output of the authenticating.

According to an embodiment of the present invention, a system for securing data acquired by coordinate measurement devices is provided. The system includes a memory having computer readable instructions and one or more a processors for executing the computer readable instructions. The computer readable instructions include securing data acquired by coordinate measurement devices including receiving a request from a requestor to access a data file including data that was acquired by a coordinate measurement device. The data file is retrieved and the content of the data file is authenticated. The authenticating includes retrieving an expected digital security attribute previously calculated by a digital security function based on content of the data file prior to the data file being retrieved. The authenticating also includes applying the digital security function to the data file to calculate an actual digital security attribute, and comparing the expected digital security attribute to the actual digital security attribute. Based on the comparing, a value of valid or not valid is assigned to an output of the authenticating.

According to another embodiment of the present invention, a method for tracking a digital asset is provided. The method includes receiving a data file that includes data acquired by a coordinate measurement device. A chain of custody for the data file is provided and output to an authorized requestor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
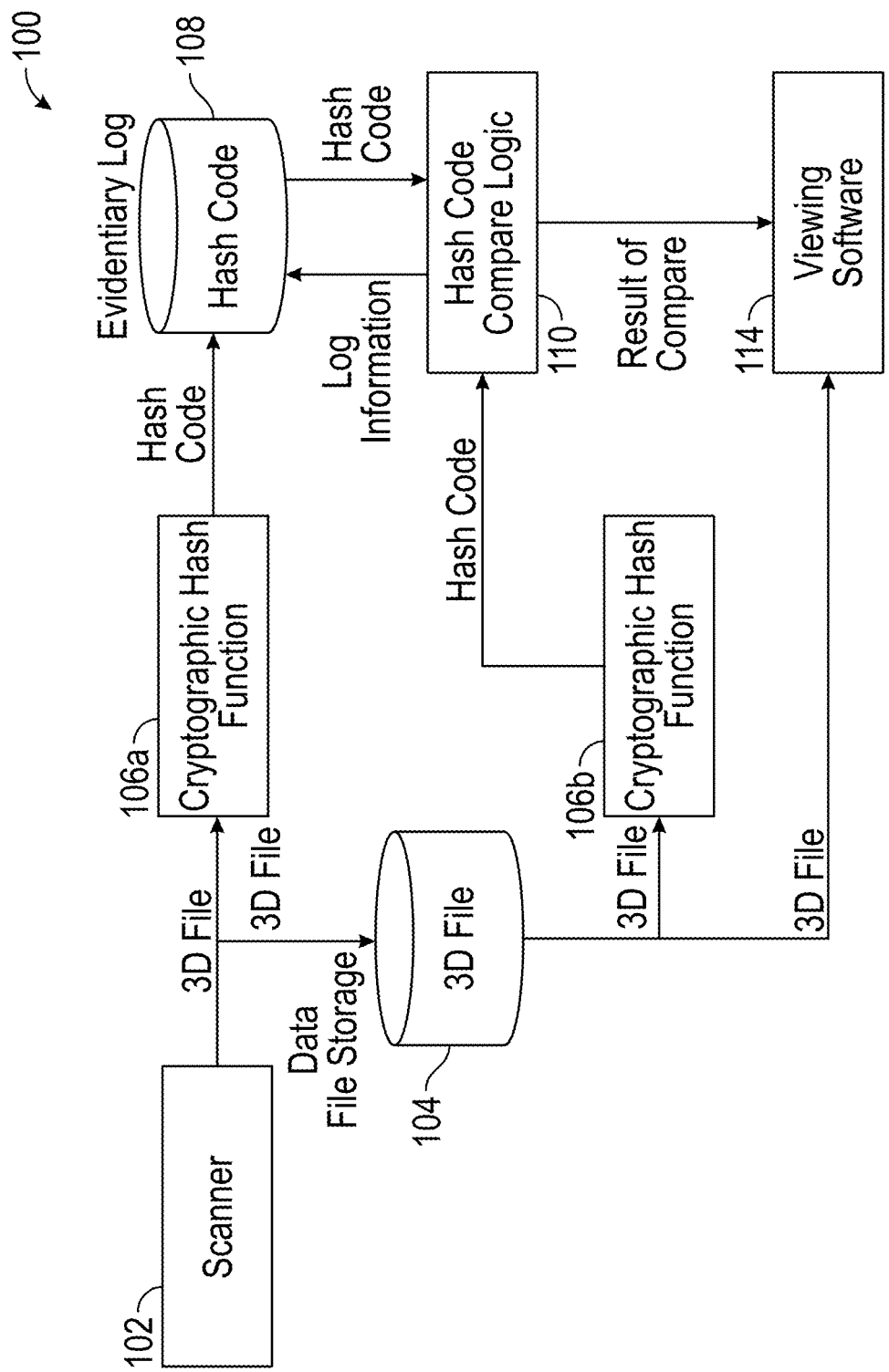
FIG. 1 is a schematic illustration of components of a system for securing data acquired by coordinate measurement devices in accordance with one or more embodiments of the present invention.

The detailed description explains embodiments of the invention, together with advantages and features, by way of example with reference to the drawings.

DETAILED DESCRIPTION

Embodiments of the present invention relate to securing data acquired by coordinate measurement devices. In accordance with one or more embodiments, a back-end process is provided that ensures the integrity of digital assets through the use of data integrity verification methods such as cryptographic hash functions to verify that a digital asset has not been modified and evidentiary logs which can be submitted as evidence of data asset integrity. In accordance with one or more embodiments of the present invention, the authenticating and logging are performed automatically upon each use of a digital asset, or data file. By automating the process, the extra work required by the user in having to verify the authenticity of a secured digital asset upon each use of the secured digital asset is eliminated. In addition, by automating the process, human error in forgetting to verify a data file and/or forgetting to log a verification of a data file can also be prevented. In accordance with one or more embodiments of the present invention, notifications that include results of the authentication are logged, and output to the user of the data file or to a third party. A communication to the user can indicate in real time (e.g., prior to the user accessing the digital asset) that all the requested or associated files have been checked and verified, and alerts can indicate any issues with the digital asset(s). Communicating the results of the authentication to the user can prevent time spent on tampered or corrupted assets and avoid wasted effort or potentially flawed analysis. The terms "digital asset" and "data file" are used interchangeably herein to refer to a computer file storing content of value to a corporation, public safety agency, or other entity.

In accordance with one or more embodiments of the present invention, a reference to a file name, a hash code (or hash value)(or other digital security attribute) calculated based on original contents of the file, and an identifier of the method used to calculate the hash code are stored in an evidentiary log. For example, crime scene investigators can create a log entry for an original data file that includes the hash code that was computed by hardware before the original data file was transferred into a long term storage system. Alternatively, in cases where the hardware does not have this function, the hash code can be calculated by the storage system or another third party application and entered into the system by recording the hash code in the log.

The reference system, or log, can be in many forms such as a web site listing the files and the hash details, an online or internal database, a portable document format (PDF) file, or any other form where the original hash code information can be captured and kept secure. Keeping the original hash code information secure prevents a user from circumventing the system by changing the digital asset, computing a new hash code, and logging the new hash code into the log.

In accordance with one or more embodiments of the present invention, the reference system accepts legitimately edited or altered files (i.e., edited or altered by a user having authorization to update the file) as revisions and stores these files with the documented edits/changes, and then create new hash codes, or other digital security attributes, for the altered files while retaining the original file and hash information in the log. In an embodiment, the back-end system can interface to digital asset preparation and editing software (e.g., SCENE™ software which is developed by FARO Technologies, Inc. of Lake Mary, Fla.; Geomagic Wrap developed by 3D Systems, Inc.; and Photoshop® developed by Adobe Systems Incorporated) and/or investigation simulation and modeling software (e.g., FARO Zone software which is developed by FARO Technologies, Inc. of Lake Mary, Fla.; Ansys® which is developed by Ansys, Inc. of Canonsburg, PS, physics simulation software; additional engineering or crash analysis software and/or computer aided design or "CAD" programs) and each can provide, or create, entries for log. In this manner, an independent third party can take the original asset, apply the same changes and reproduce the resultant file, thus verifying the integrity of the asset preparation process and the digital integrity of the simulations and analysis prepared the investigation or trial presentation. This allow for independent verification of the digital chain of custody.

When a user wants to work with a digital asset having a log entry, the user requests the 3D data file for download and a new hash code is automatically (without user intervention) calculated based on the downloaded three-dimensional (3D) data file. The new hash code is automatically compared to the logged hash code so that the user knows that the 3D data file has not been corrupted in the transfer and that contents of the downloaded file match the contents of the original file. In accordance with one or more embodiments, all 3D data files are checked when they are loaded onto a computer or mobile device from a secured location to verify the authenticity of the 3D data files. In addition, a back-end process can monitor a secured location (e.g., server, drive, folder structure, etc.) on the computer or mobile device and provide information about the last time that everything was verified to a dashboard function, a security operations center, and/or a target application. In accordance with one or more embodiments of the present invention, an end-user computer application or mobile application automatically checks all the imported digital assets when they are received in order to confirm 3D data file integrity. In embodiments, this process is integrated into the end-user's software so that in the context of their workflow and user interface they can be certain that they are working with verified assets. In other embodiments, the process is performed by a standalone application, backend servers, cloud computing or mobile application.

In accordance with one or more embodiments of the present invention, monitoring is performed on a file level process, where the back-end process that is monitoring the secure digital asset location transmits alerts when significant events are detected, such as, but not limited to: new files being added, files being deleted, any changes to the file properties, and failures of the security scan/hash check. The alerts can be written to the evidentiary log, sent to a security operations center, and/or sent to one or more specified users.

In accordance with one more embodiments of the present invention, end-user applications or mobile applications can have a green-verified and a red-error graphic somewhere in the user interface. Thus, a green colored graphic can indicate that the calculated hash code matched the expected hash code for the 3D data file and a red colored graphic can indicate that that calculated hash code did not match the expected hash code for the 3D data file. Any user notification GUI elements can be implemented by embodiments including, but not limited to graphical elements, text elements, and/or color base elements. The hash code comparison function can generate errors that can be passive or that can require user acknowledgement to continue in the workflow.

In accordance with one or more embodiments of the present invention, end-user applications and/or back-end processes generate and secure log files for all events and operations that can be filtered to allow for analysis of the file history. Pertinent information can be captured in the logs such as but not limited to time, date, user, operation executed, and results.

Exemplary embodiments of the present invention described herein provide for both original 3D data files and original hash codes, or other digital security attributes, to be secured and moved through a work processes in a secure method so that an investigative process can be completed with integrity, and trial evidence can be generated and submitted confidently. The automated process described herein can include a security workflow that is integrated into software applications that operate on data assets that are used to prepare and conduct analysis for investigations. Example software applications include, but are not limited to photo editing software; engineering analysis software for bridges or other structures, building collapse investigations and product liability investigations; and crime and crash scene visualization and analysis software.

The automated process described herein provides advantages over contemporary methods by removing the reliance on an end-user manually initiating computer software to compare files and hash codes, which is open to human error and inefficiencies. In addition, contemporary manual methods of verifying file integrity can be time consuming and cumbersome for end-users and as a result may not be followed at all times. The automated process described herein removes the burden from the end-user and performs the verification automatically as part of the work flow when an end-user downloads a file from a secure location. Removing the reliance on end-users for performing the authenticating and automatically logging information about accesses to a secured 3D data file can result in a more accurate evidentiary log for providing a chain of custody of the 3D data file.

Embodiments are described herein in terms of a 3D data file and a hash code. A 3D data file is one example of a type of data file that includes data acquired by a coordinate measurement device. Embodiments of the present invention are not limited to data files that are 3D data files and can include any type of data file containing data acquired by a coordinate measurement device. In addition, a hash code is one example of a digital security attribute that can be generated by applying a digital security function (e.g., a hash function) to contents of a data file. Embodiments of the present invention are not limited to hash codes and hash functions, and can include any type of digital security known in the art to verify the authenticity of a digital asset. For example, other types of digital security that can be implemented by embodiments include, but are not limited to digital signatures, ciphers, cryptographic sponges, fingerprints, check digits, and checksums.

Turning now to FIG. 1, a schematic illustration of components 100 of a system for securing data acquired by coordinate measurement devices is generally shown in accordance with one or more embodiments of the present invention. The components 100 shown in FIG. 1 include scanner 102, data file storage 104, cryptographic hash function 106, evidentiary log 108, hash code compare logic 110, and viewing software 114. The scanner 102 shown in FIG. 1 can be executing scan processing software such as SCENE™ software which is manufactured by FARO Technologies, Inc. of Lake Mary, Fla. to create a 3D file that is stored in the data file storage 104. In accordance with one or more embodiments of the present invention, storing the 3D file in data file storage 104 includes initiating a background process that inputs the 3D file to cryptographic hash function 106a and initiates execution of the cryptographic hash function 106a.

In an embodiment, the scanner 102 is a coordinate measurement device, or metrology device, such as a 3D laser scanner time-of-flight (TOF) coordinate measurement device that generates 3D representations of areas, such as crime scenes or accident scenes for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable software executing on a processor in the device to determine the 3D coordinates of the target. It should be appreciated that while embodiments herein describe the data as being acquired by a coordinate measurement device that is a TOF laser scanner device, this is for exemplary purposes and the claims should not be so limited. In other embodiments, the coordinate measurement device may be an articulated arm coordinate measurement machine, a laser line probe, a triangulation scanner, an area scanner, a structured light scanner, a photogrammetry device, a 2D camera used in a photogrammetry application, a videogrammetry device, a range camera, a RGB-D camera, a total station, a theodolite or a laser tracker for example. As used herein, a range camera or a RGB-D camera is a camera that acquires a two-dimensional image with depth information. The data acquired by the coordinate measurement device may include measurement data, coordinate data, 2D images, angles, audio recordings, or video recordings. The coordinate data may be either two-dimensional (2D) or three-dimensional (3D) coordinate data.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data, referred to herein as a point cloud (or point cloud data), is collected, stored and sent to a processor or processors to generate a 3D image representing the scanned area or object. Raw scan data is an example of one kind of a 3D file that can be output by scanner 102.

Though not shown in FIG. 1, devices other than a scanner 102 such as, but not limited to articulated arm coordinate measurement machines, a laser line probes, triangulation scanners, area scanners, structured light scanners, photogrammetry devices, videogrammetry devices or a laser trackers can be used by one or more embodiments to generate 3D files. Contents of the 3D data files can include, but are not limited to data, images, transformation data, calibration information, and certification results. In accordance with one or more embodiments, data file storage 104 is a secure storage location. In an embodiment, a user is required to have a unique identifier (ID) and a secure password to access the assets in the data file storage 104. A higher level of user rights can be required for access to the evidentiary log 108 as updates to the original data security attributes will invalidate the whole process. Thus, in an embodiment no one can delete or edit the original hash information in the evidentiary log 108, they can only add new information or make corrections as needed that will be logged with a justification of the required changes. Standard information technology (IT) practices can be used to provide for backup and retention of the digital assets in the data file storage 104 and hash database/log system in the evidentiary log 108. In an embodiment, there is a secure and audited process to archive the information in the data file storage 104 and the evidentiary log 108 as required. In accordance with one or more embodiments, 3D files having corresponding hash codes stored in evidentiary log 108 are stored in data file storage 104. When the files are stored, a background process is initiated to calculate a hash code using cryptographic hash function 106a and to store the hash code in evidentiary log 108. In addition, requests to access the 3D files in the data file storage 104 can initiate the background processes described herein that check expected and actual hash code values using hash compare logic 110 and that write entries to the evidentiary log 108 to record results of the hash code check. In an embodiment, the evidentiary log 108 is in the form of a database or object oriented data store where metadata can be linked to files that represent the change log or other required information. In an embodiment, the evidentiary log 108 includes files in a file system or values in a database with additional properties as required and log information, while the data file storage 104 is more of a simple file share.

A cryptographic hash function can be executed using data, such as an individual file, as input to produce a hash code, or checksum for the data. Cryptographic hash functions are designed to prevent being able to reverse the hash codes they create back into the original data, and they can be used to verify the authenticity of 3D data files. Two files can be assured to be identical if the hash codes generated from each file, using the same cryptographic hash function, are identical. Cryptographic hash functions 106a and 106b can be implemented by any cryptographic hash function known in the art such as, but not limited to: Message Digest 4 (MD5) and Secure Hash Algorithm 1 (SHA-1). In accordance with one or more embodiments, cryptographic hash function 106a is initiated when a 3D file is stored in selected secure storage locations, such as data file storage 104. In an embodiment, the executable code that implements the cryptographic hash functions is controlled and verified as being unaltered as part of the back end process described herein. In another embodiment, control and verification of the cryptographic hash functions is performed as part of an organizations broader cyber security process.

The hash code produced by cryptographic hash function 106a is stored as an entry in evidentiary log 108. In an exemplary embodiment, the entry in evidentiary log 108 includes the hash code, an identifier of the 3D file used to calculate the hash code, and an identifier of the type of cryptographic hash function 106a. Similar to data file storage 104, the evidentiary log 108 is located in a secure storage location. The evidentiary log 108 can store additional information related to the 3D data files in data file storage 104 such as, but not limited to, an identifier of an end-user accessing a 3D data file, a timestamp of when the 3D data file was downloaded, a timestamp of when the 3D data file was created or update, and a network address of a requestor of the 3D data file.

As described previously, the evidentiary log 108 can be in many forms such as a web site listing the files and the hash details, an online or internal database, a portable document format (PDF) file, or any other form where the original hash code information can be captured and kept secure.

Once a 3D data file is stored in data file storage 104, viewing software 114 can request the 3D data file from data file storage 104. In accordance with one or more embodiments of the present invention, the viewing software 114 and the data file storage 104 are located in different geographic locations and communicatively coupled via a network. The viewing software 114 can be SCENE™ software which is developed by FARO Technologies, Inc. of Lake Mary, Fla. Depending on the type of 3D data file and the type of analysis being performed by an end-user, software other than viewing software 114 can be used by one or more embodiments to access a 3D data file in a secure manner. Examples of other types of software include, but are not limited to: software that is used to edit, clean, and prepare the digital assets; and software that is used for analysis, simulation and presentation of the assets for investigative purposes or for presentation as evidence or testimony in a hearing or trial.

In accordance with one or more embodiments of the present invention, when a 3D data file is requested from data file storage 104, a process to verify the authenticity of the downloaded 3D data file is automatically (without user input) initiated. This process can run in the background and can include executing cryptographic hash function 106b using the downloaded 3D data file as input to produce a hash code. Cryptographic hash functions 106a and 106b implement the same hash functions. In addition, to initiating execution of cryptographic hash function 106b, the previously stored hash code for the 3D data file is retrieved from the evidentiary log 108, and the hash compare logic 110 compares the two values.

As shown in FIG. 1, the result of the compare is communicated to the viewing software 114. The viewing software 114 can provide a visual indicator to the end-user (e.g., a green light on a hardware device, a graphic on a user interface screen) to indicate that the 3D data file has been authenticated. In addition, the viewing software 114 can provide a visual indicator to the end-user to indicate the 3D data file has failed authentication and can optionally prevent the end-user form accessing the 3D data file. In addition, log information which includes the results of the compare along with additional information such as an identifier of the 3D data file can be stored as an entry in the evidentiary log 108. In embodiments, only log information about failing authenticity tests (e.g., the hash codes do not match) are logged in the evidentiary log 108. In other embodiments all accesses to the 3D data file are logged in the evidentiary log 108.

In accordance with one or more embodiments of the present invention, another level of security can be introduced by encrypting the hash codes. In an embodiment, the encryption takes place at the source system that creates or generates the digital asset. The system can assign an encryption key (e.g., randomly generated, based on the combination of the user ID, device serial number, time/date of the asset creation, etc.) and the system then logs the encryption key into the encryption key database. Then when other downstream processes want access to the hash codes in the evidentiary log 108 they also send a request to the encryption key database so they can decrypt the hash and use it in the compare process 110. In an embodiment this process is run manually, with the user that creates the digital asset entering the desired encryption key for the asset and adding this to a paper or electronic log so that it can be used later as required. It is important to accurately log and retain the encryption key in order so that access to the original data asset hash is not lost.

In accordance with one or more embodiments of the present invention, the 3D data file could be a single file or a group of files that can each have their own hash code. When the 3D data file is accessed, the hash code of each of the files within the 3D data file is checked against an expected hash code using the processing described herein. In an embodiment, the collection of files is referred to as an archive and they can be compressed to reduce the required storage footprint in the storage system. In an embodiment, the collection of files uses a compression system (e.g., .zip, .rar) that gathers all the related files into a single compressed archive.

In accordance with one or more embodiments, a scanner generates a laser scan that is stored as a set of scan files in a directory on a storage medium such as, but not limited to a secure digital (SD) memory card. Examples of scan files can include, but are not limited to: binary files containing sensor data; and text files containing scan metadata such as the time the scan was captured and the scan parameters provided by the user. In an embodiment hashing is performed for each scan data file of the laser scan with the scanner calculating a cryptographic hash code (e.g., SHA256) for each of the scan data files. The scanner can create a textual digest file containing the names of all scan data files that make up the laser scan together with their hash codes, and store the digest file on the SD card. The scanner can then calculate the cryptographic hash code of the digest file and display the hash code of the digest file on the GUI of the scanner. In addition, or alternatively, the hash code of the digest file is written on the SD card. The hash code of the digest file (and/or of individual scan data files) can be signed by the scanner using a private key contained in the firmware of the scanner.

To validate that a scan file was not manipulated (e.g., to validate a chain of custody of the set of scan files), the validator can recalculate the digest hash code in the same way that the scanner did during the scan. If one or more scan files listed in the digest have changed, then their hash codes will be different. If one or more of the hash codes are different, then the digest will be different and in turn the hash code of the digest will be different than that calculated by the scanner. The validator can perform automatic checking by using a tool that validates the signature of the digest hash code. If the check is successful, this proves that the hash code was generated by the scanner and has not been recalculated by some other entity. The checking can also be performed manually by the validator, with the validator comparing the hash code of the digest that the validator calculated with the hash code of the digest that was shown on the GUI of the scanner at the scan site. When the manual method is used, the hash code shown on the GUI of the scanner must have been written down and secured by a trusted entity (e.g., a public safety official or a police officer located on-site where the scans are performed).

In an embodiment, a hash function is applied to a combination of a scan file and a unique attribute of the scanner such as, but not limited to a serial number of the scanner, a calibration value associated with the scanner, or a media access control (MAC) address of scanner. This can be used to associate or tie the scan file(s) to a particular scanner.

Figure 2:
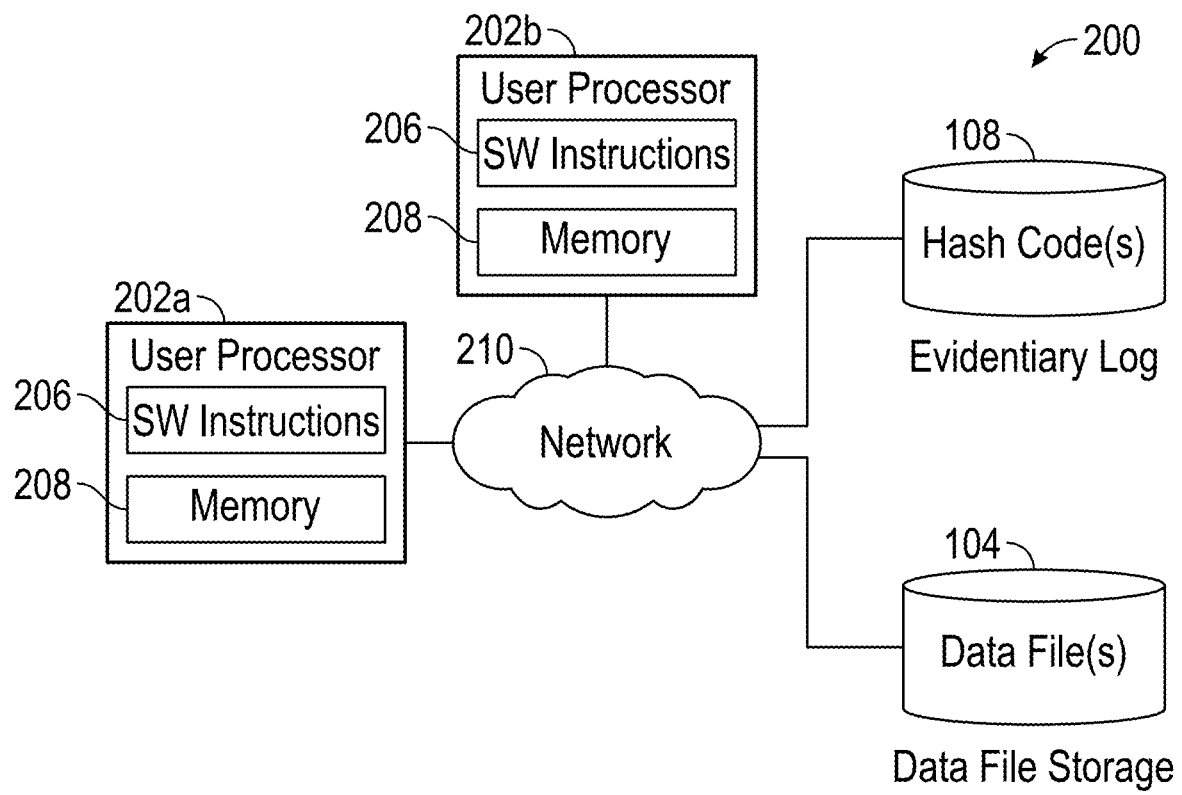
FIG. 2 is a schematic illustration of a system for securing data acquired by coordinate measurement devices in accordance with one or more embodiments of the present invention.

Turning now to FIG. 2 a schematic illustration 200 of a system for securing data acquired by coordinate measurement devices is generally shown in accordance with one or more embodiments of the present invention. The system 200 shown in FIG. 2 includes user processors 202, evidentiary log 108, data file storage 104, and network 210.

Each user processor 202 shown in FIG. 2 includes software instructions 206 for execution by the user processor 202 to retrieve and/or to store 3D data files, as well as a memory 208 for storing local copies of the 3D data files. The memory 208 in the user processors 202 shown in FIG. 2 is contained in a user processor 202, however in other embodiments the memory 208 is a storage device external to the user processor 202.

In the embodiment shown in FIG. 2, each user processor 202 is communicatively coupled to network 210. The system 200 shown in FIG. 2 also includes the evidentiary log 108 and the data file storage 104 being communicatively coupled to network 110.

The evidentiary log 108 and the data file storage 104 can be stored in any known type of memory or storage device and in any known format and are not limited to being stored in databases as shown in FIG. 2. In addition, the evidentiary log 108 and the data file storage 104 can be implemented as a single database. Further, each of the evidentiary log 108 and the data file storage 104 can be implemented as a plurality of databases or as a digital file collection. This collection of files can be located on any number of storage systems such as, but not limited to a file server or network attached storage (NAS) system where there is a file system with a folder and a file structure. The collection of files can also be located in an online cloud storage system(s) (e.g., remote file servers) or in a secure digital (SD) card(s) or in a universal serial bus (USB) drive(s) could be a temporary digital file collection that would want to be secured. In the case of a temporary transfer situation 104 and 108 could be on the same device where at a minimum 108 is encrypted and only those with authority in the chain of custody of the digital assets could access the unencrypted contents. The devices creating the digital assets (HW and/or SW) would be authorized to write to 108 on this temporary digital file collection. When the assets are transferred to long term storage on network file shares or NAS devices, there would be a process for the data collector to login to the system and add these new assets and the hash data to the long term storage system.

The network 210 shown in FIG. 2 can include one or more of any type of known networks including, but not limited to, a wide area network (WAN), a local area network (LAN), a global network (e.g. Internet), a virtual private network (VPN), and an intranet. The network 210 can include a private network in which access thereto is restricted to authorized members. The network 210 can be implemented using wireless networking technologies or any kind of physical network implementation known in the art. The components shown in FIG. 2 may be coupled to one or more other components through multiple networks (e.g., Internet, intranet, and private network) so that not all components are coupled to other components through the same network 210.

In an embodiment, user processor 202a is a scanner, such as scanner 102 of FIG. 1 and the software instructions 206 include scan processing software as well as additional computer instructions to perform the background processing described herein to store a 3D data file in secure storage, such as data file storage 104. The software instructions 206 can detect a request to upload a 3D data file from memory 208 to secure storage and based on detecting the request execute a cryptographic hash function, such as cryptographic hash function 106a of FIG. 1. The software instructions 206 on user processor 202a can then store the resulting hash code in a log, such as evidentiary log 108, and store the 3D data file in secure storage. Additional information such as, but not limited to an identifier of the 3D data file, an identifier of a user and/or user processor requesting the upload to the secure storage, and a timestamp can be included in the log entry along with the hash code. Log entry contents can be customized based on user requirements. For example, an evidentiary log entry can have the data required to create a chain of custody of a 3D data file. As used herein, the term "chain of custody" refers to the chronological documentation or paper trail that records the sequence of custody, control, transfer, preparation and or editing, analysis, simulation, visualization, presentation and disposition of physical or electronic evidence (e.g., 3D data files containing crime scene images).

In an embodiment, user processor 202b is a personal computer or other user device and the software instructions 206 include viewing software as well as additional computer instructions to perform the background processing described herein to verify the authenticity of 3D data files retrieved from specified secure storage locations, such as data file storage 104. The software instructions 206 can detect a download of a 3D data file from a secure storage location to memory 208 and based on detecting the download, perform verification processing prior to opening, or providing access, to the downloaded 3D data file. The verification processing can include requesting the hash code (e.g., the expected hash code) for the 3D data file from a log, such as evidentiary log 108, and executing a cryptographic hash function, such as cryptographic hash function 106b of FIG. 1 to generate a hash code (an actual hash code) for the downloaded 3D data file. The verification process can further include comparing the expected hash code to the actual hash code using, for example, hash code compare logic 110 of FIG. 1. Based on the hash codes being the same, the downloaded 3D data file can be operated on by the viewing software and optionally the end-user can be notified via a visual or other indicator that the downloaded file has been authenticated. Based on the hash codes being different, the viewing software can be prevented from opening the downloaded 3D data file and/or the end-user can be notified via a visual or other indicator that the downloaded file is not the same as the file stored in the secure storage. In addition, or alternatively, if the hash codes are different, the end user can be prompted to download the file again and the hash codes can be compared again to eliminate verification failures caused by the transfer of the data due to a slow or low quality connection to the data file storage 104.

The results of the authentication and the hash code can be stored to the log by software instructions 206 as part of the background process. Additional information such as, but not limited to an identifier of the 3D data file, an identifier of a user and/or user processor requesting the download from the secure storage, and a timestamp can also be included in the log entry. Log entry contents can be customized based on user requirements. For example, an evidentiary log entry can have the data required to create a chain of custody of a 3D data file. In an embodiment, an application programming interface (API) into the software packages can record any changes made to the file to clean, edit, and process the digital asset. In another embodiment, incremental file saves where the user is prompted to enter log notes as to what they did to edit and/or prepare the file (digital asset) are retained. In an embodiment, a heat map (e.g. a color coded image) is used to show changes between incremental copies of the 3D data file.

In accordance with one or more embodiments of the present invention, the software instructions 206 located on both user processor 202a and user processor 202b can perform the background processing to store a 3D data file in secure storage and the background processing to verify the authenticity of 3D data files downloaded from secure storage locations. Software instructions to perform cryptographic hash function 106 and the hash compare logic 110 can be physically located on the user processors 202. Alternatively, software instructions to perform the cryptographic hash function 106 can be located on a different processor (not shown) and initiated by the user processors 202 via the network 210. Alternatively, the software instructions to perform the cryptographic hash function 106 can be included in logic associated with the secure file storage and initiated by the secure file storage when it detects a request to store or to retrieve a 3D data file (or particular 3D data files).

In accordance with one or more embodiments of the present invention, software instructions to perform the hash compare logic 110 are physically located on a user processor 202. Alternatively, software instructions to perform the hash compare logic 110 can be located on a different processor (not shown) and initiated by the user processors 202 via the network 210. Alternatively, the software instructions to perform the hash compare logic 110, to log the results, and to output the results to viewing software 114 can be included in logic associated with the secure file storage and initiated by the secure file storage when it detects a request to retrieve a 3D data file (or particular 3D data files). Alternatively, the software instructions to perform the hash compare logic 110, to log the results, and to output the results to viewing software 114 can be included in logic associated with the log and initiated by the log when it receives a verification request from the viewing software 114 that includes a hash code and an identifier of a 3D data file that is tracked by the log (e.g., has a hash code in an entry in the log).

In accordance with one or more embodiments of the present invention, software instructions to interact with the log to write entries and to read hash codes can be physically located on a user processor 202. Alternatively, software instructions to interact with the evidentiary log 108 can be located on a different processor (not shown).

In accordance with one or more embodiment of the present invention, the data file storage 104 includes a copy of the hash code calculated for each 3D data file stored in the data file storage 104.

Figure 3:
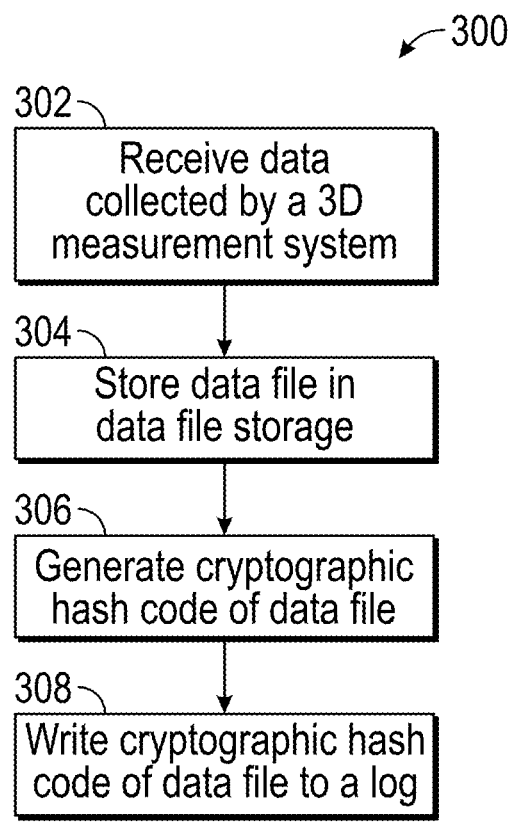
FIG. 3 is a flow diagram illustrating a method for securing data acquired by coordinate measurement devices when a three-dimensional (3D) data file is created in accordance with one or more embodiments of the present invention.

Turning now to FIG. 3, a flow diagram 300 illustrating a method for securing data acquired by coordinate measurement devices when a file is created is generally shown in accordance with one or more embodiments of the present invention. In an embodiment, the processing shown in FIG. 2 is performed by computer instructions executing on user processor 202 shown in FIG. 2. In an embodiment, the processing shown in FIG. 2 is performed by a processor other than the user processors 202 shown in FIG. 2. For example, the processing may be performed by a processor used by the data file storage 104 or the evidentiary log 108 to store or retrieve data. At block 302, scan data collected by a coordinate measurement device is received as a 3D data file. The scan data can include for example a point cloud representing an accident scene or a crime scene. At block 304, the 3D data file is stored in data file storage 104, and at block 306 a hash code is calculated using the 3D data file as input to a cryptographic hash function. The hash code of the 3D data file is written to a log at block 308. As described previously, blocks 304 through 308 can be initiated automatically (without user input) when a 3D data file is stored in a secure storage location. The processing in these blocks can be added to a workflow process that collects data from a coordinate measurement device and stores it to a secure data location. In accordance with one or more embodiments of the present invention, the processing in block 304 through 308 is performed only for 3D data files that are identified as requiring authentication based for example, on the contents of the 3D data file or the storage of the 3D data file.

Figure 4:
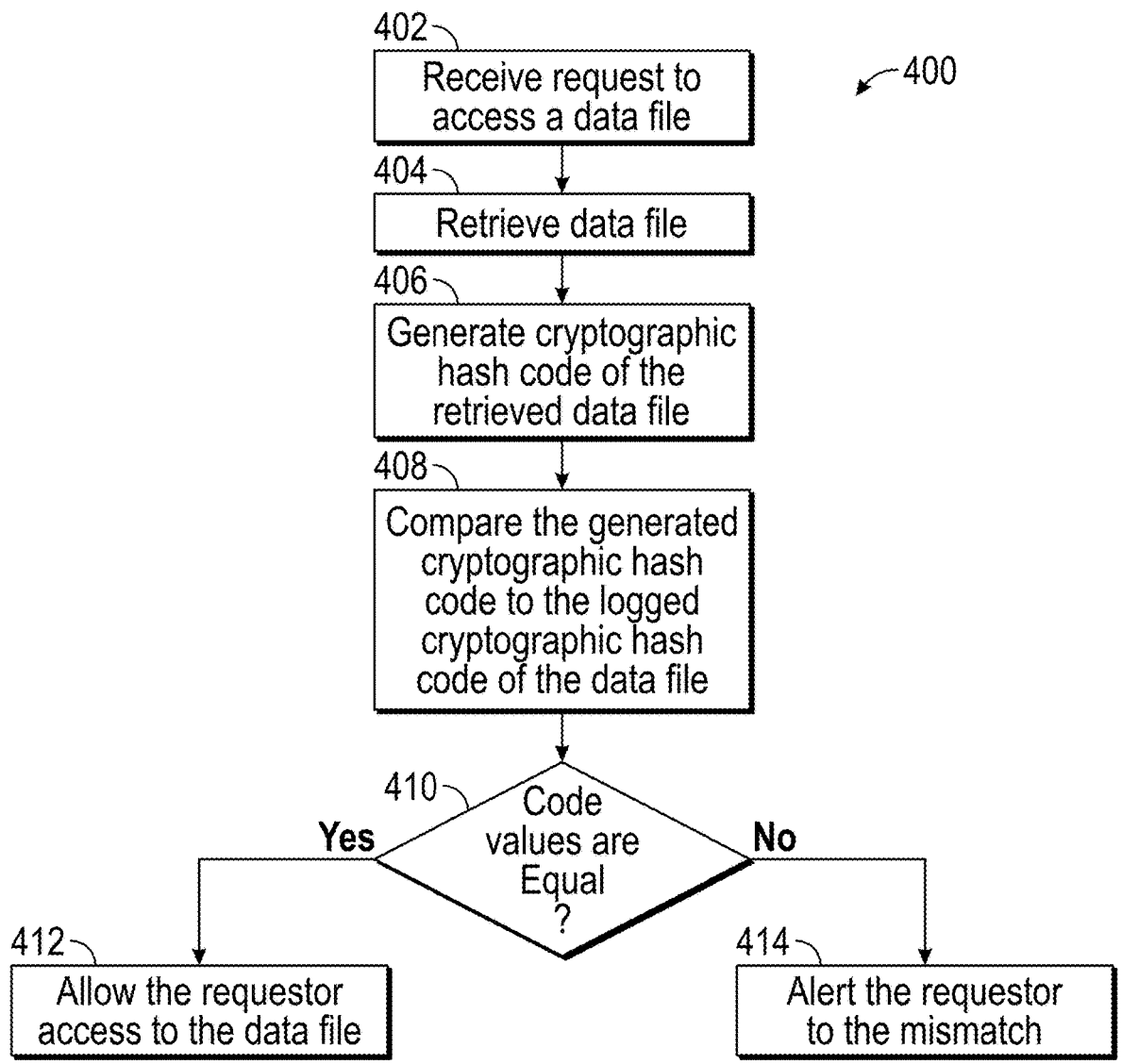
FIG. 4 is a flow diagram illustrating a method for securing data acquired by coordinate measurement devices when a 3D data file is accessed in accordance with one or more embodiments of the present invention.

Turning now to FIG. 4, a flow diagram 400 illustrating a method for securing data acquired by coordinate measurement devices when a file is accessed is generally shown. In an embodiment, the processing shown in FIG. 2 is performed by computer instructions executing on user processor 202 shown in FIG. 2. In an embodiment, the processing shown in FIG. 2 is performed by a processor other than the user processors 202 shown in FIG. 2. For example, the processing may be performed by a processor used by the data file storage 104 or the evidentiary log 108 to store or to retrieve data. At block 402, a request to access a 3D data file is received. In embodiment, the requested 3D data file was created based at least in part on scan data collected by a coordinate measurement device. At block 404, the requested 3D data file and its expected hash code (e.g., the hash code generated at block 306 of FIG. 3 when the 3D data file was first created) are retrieved. As described previously, the 3D data file can be stored in a secure storage location and the expected hash code stored in an evidentiary log. The retrieved 3D data file is authenticated prior to providing the requestor with access to the 3D data file.

In accordance with one or more embodiments of the present invention, the authenticating includes generating a hash code of the retrieved 3D data file at block 406 and comparing the expected hash code to the actual hash code at block 408. In this manner, the hash code generated for the 3D data file before it was retrieved (e.g., when it was originally stored in the secure storage location) is compared to the hash code generated for the 3D data file after it was retrieved (e.g., when it is stored in memory 208 in a user processor 202) to verify that 3D data file has not changed. In an embodiment, a copy of the 3D data file is downloaded and the authentication verifies that the downloaded copy of the 3D data file is the same as the original 3D data file stored in the secure storage location. At block 410 it is determined whether the expected hash code and the actual hash code match (e.g., have the same value). Based on the expected hash code matching the actual hash code, block 412 is performed and a value of "valid" is assigned to an output of the authenticating. Based on the expected hash code not matching the actual hash code, block 414 is performed and a value of "not valid" is assigned to the output of the authenticating. The request to access the 3D data file and the output of the authenticating can be recorded in a log, such as evidentiary log 108.

In an embodiment, the requestor of the file is provided access to the retrieved 3D data file based on the output of the authenticating having a value of valid. In addition, the requestor of the file can be prevented from accessing contents of the retrieved 3D data file based on the output of the authenticating having a value of not valid. An indicator (e.g., a light on a user interface, an audible alert, and/or a graphic displayed on a user interface screen of the user processor) can be provided to the requestor to alert the requestor to the status of the 3D data file as valid or invalid. In addition, an alert such as an electronic-mail or text message can be sent to a third party when the output of the authentication has a value of invalid.

As described herein, the content of the log can provide a chain of custody of the 3D data file. Contemporary methods of performing chain of custody treat digital assets in the same manner as physical evidence. A digital asset is logged as evidence but little to no effort is typically made to maintain the integrity of the digital asset. The integrity of the digital asset is reliant on the practices of the user group (forensics team) and if the defense can call into question the handling and security of the digital asset or repository than the evidence can be called into question. If there was a security breach at the local Police Dept., that could be used against the case at trial. Further, digital assets are often edited in preparation of the analysis and to prepare the visualization assets for trial (walkthoughs). Expert opinion is used to verify the proper handling of the files today despite that fact that the defense could call into question bias in the editing and preparation of the files and cast doubt into the validity of the data. Embodiments described herein provide a framework that enforces security best practices in the collection, transportation, editing and preparation of these digital assets (items of evidence) and ease the burden of proof as everything can be verified by independent third parties as to the proper handling of the digital evidence.

Figure 5:
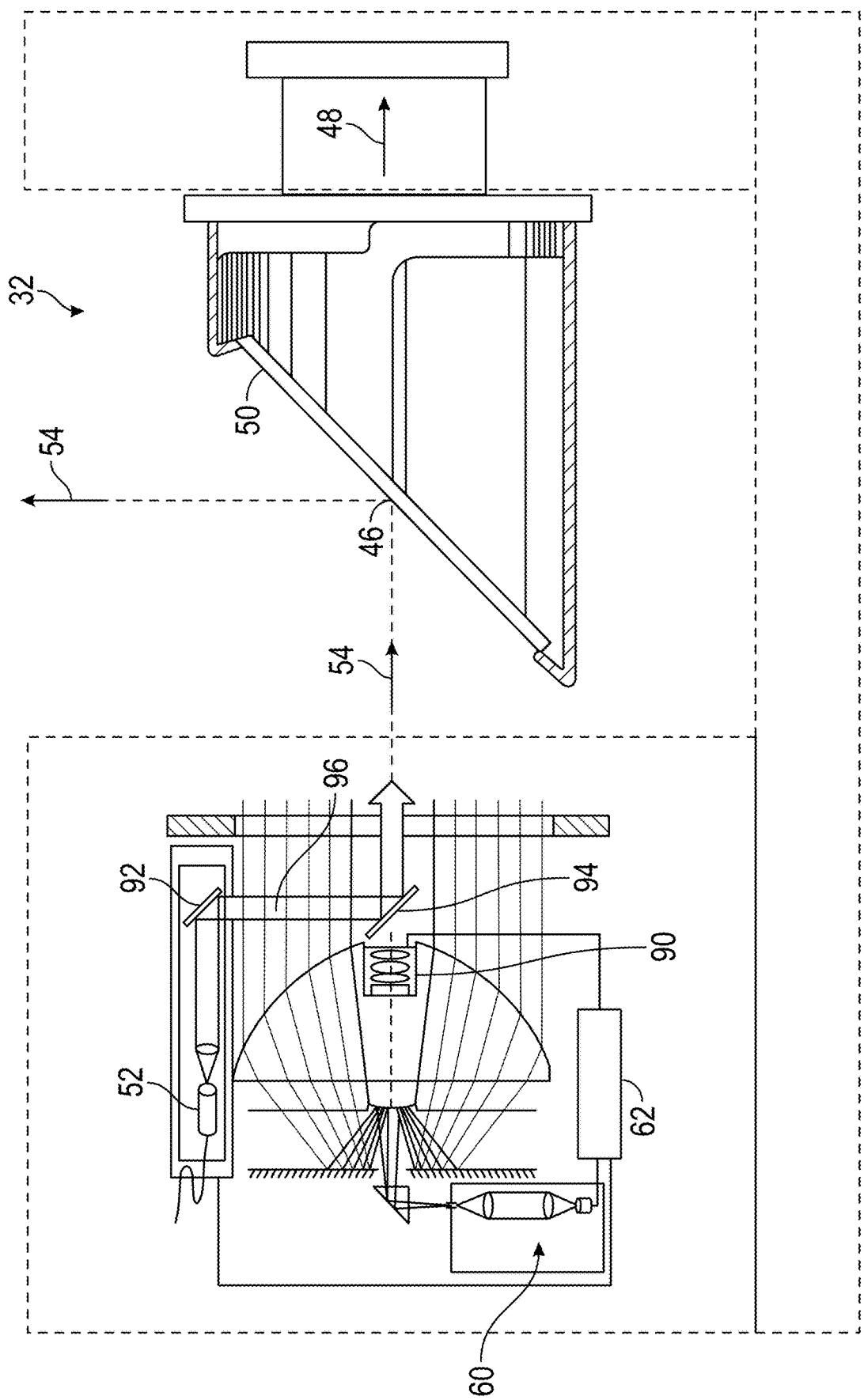
FIG. 5 is a schematic illustration partially in section along the line B-B of FIG. 6 of the optical, mechanical, and electrical components of a laser scanner in accordance with one or more embodiments of the present invention.
Figure 6:
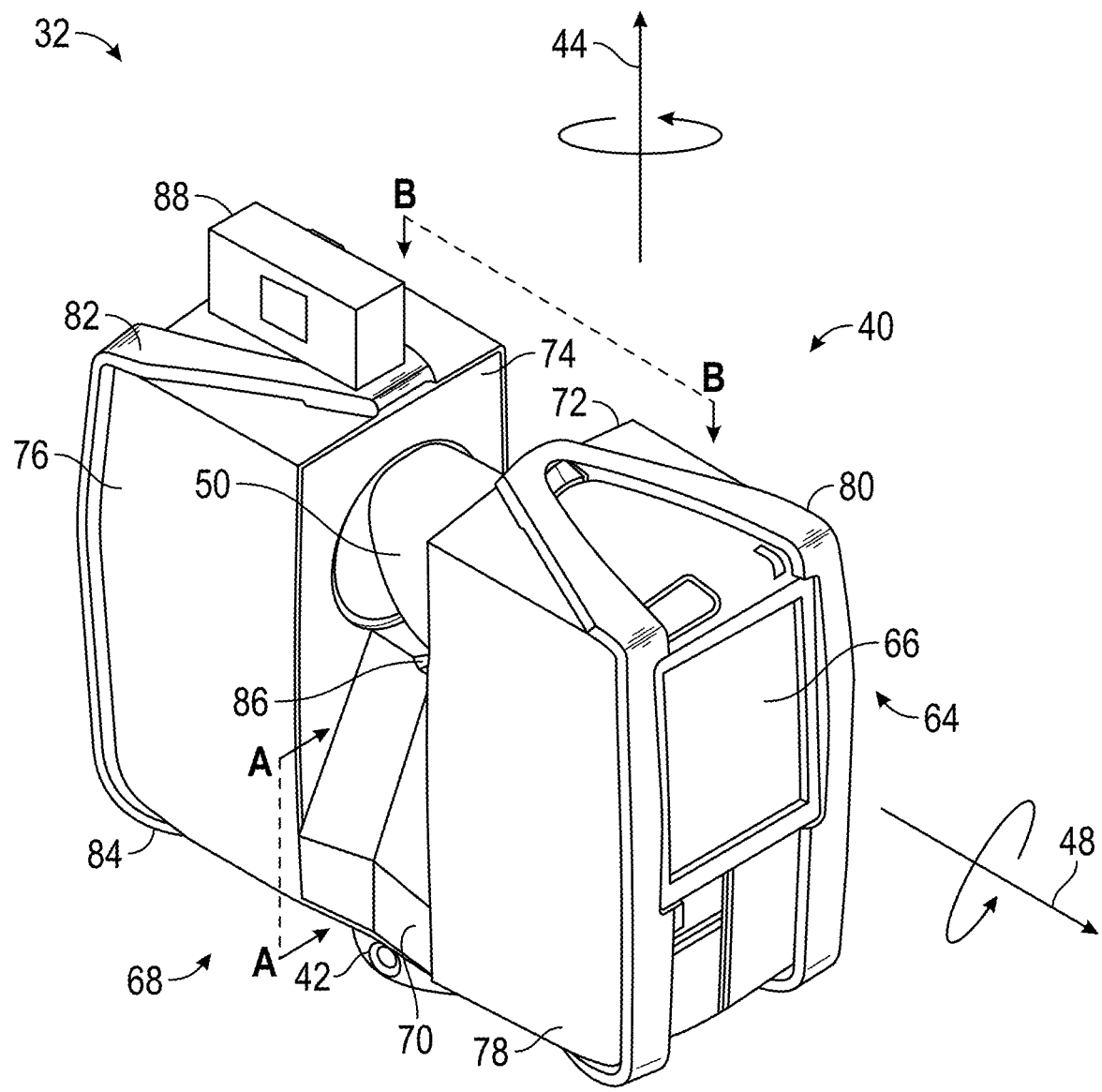
FIG. 6 is a perspective view of the laser scanner illustrating a method of measurement in accordance with one or more embodiments of the present invention
Figure 7:
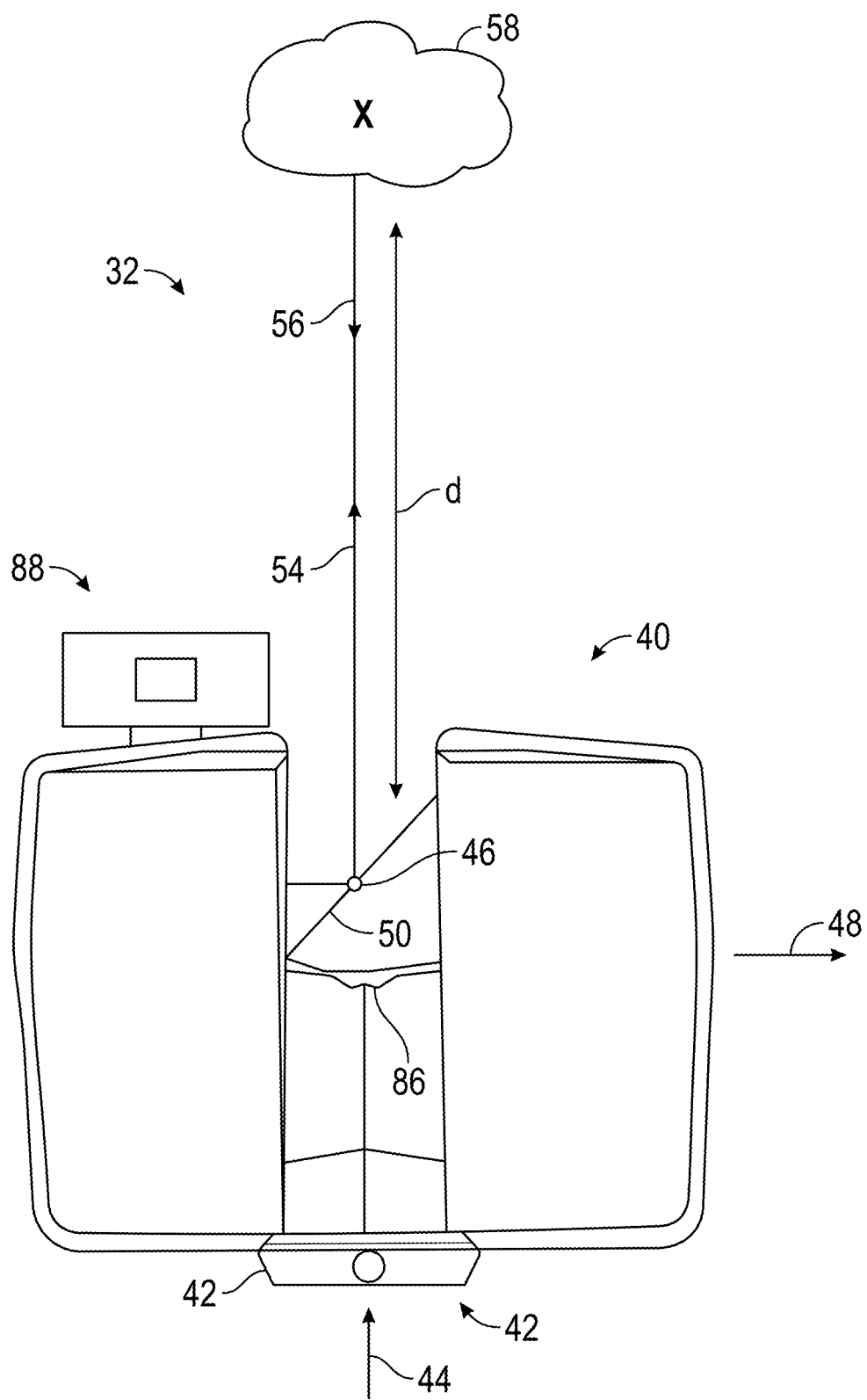
FIG. 7 is a partial side view of the laser scanner in accordance with one or more embodiments of the present invention.

Referring now to FIGS. 5-7, an exemplary coordinate measurement device, laser scanner 32, is shown for optically scanning and measuring the environment in accordance with one or more embodiments of the present invention. The laser scanner 32 includes a processor for executing scan processing software to facilitate the scanning functions described herein. In one embodiment, the scan processing software is executed on a separate processing system (e.g. a desktop computer, a laptop or a tablet) that receives the 3D coordinate data from the laser scanner 32. The laser scanner 32 has a measuring head 40 and a base 42. The measuring head 40 is mounted on the base 42 such that the laser scanner 32 may be rotated about a vertical axis 44. In one embodiment, the measuring head 40 includes a gimbal point 46 that is a center of rotation about the vertical axis 44 and a horizontal axis 48. The measuring head 40 has a rotary mirror 50, which may be rotated about the horizontal axis 48. The rotation about the vertical axis may be about the center of the base 42. The terms vertical axis and horizontal axis refer to the scanner in its normal upright position. In other words, with the axis 44 extending approximately perpendicular to the floor or ground and the axis 48 being approximately parallel with the floor or ground. It should be appreciated that it is also possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. The directions of the emitted light beam 54 and the reflected light beam 56 result from the angular positions of the rotary mirror 50 and the measuring head 40 about the axes 44, 48 respectively. These angular positions in turn depend on the corresponding rotary drives or motors.

Coupled to the light emitter 52 and the light receiver 60 is a 3D scanner processor, or controller 62. The controller 62 determines, for a multitude of measuring points X, a corresponding number of distances d between the laser scanner 32 and the points X on object. The distance to a particular point X is determined (e.g., by a distance meter implemented by the controller 62) based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the TOF of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air. In one embodiment, the method of triangulation is implemented by the scan processing software.

In one mode of operation, the scanning of the volume around the laser scanner 32 takes place by causing the rotary mirror 50 to rotate about axis 48 relatively quickly while rotating the measuring head 40 about axis 44 relatively slowly, thereby moving the assembly in a spiral pattern. In an exemplary embodiment, the rotary mirror rotates at a maximum speed of 5820 revolutions per minute. For such a scan, the gimbal point 46 defines the origin of the local stationary reference system. The base 42 rests in this local stationary reference system. In an embodiment, the operation of the laser scanner 32 is controlled by the scan processing software.

In addition to measuring a distance d from the gimbal point 46 to an object point X, the laser scanner 32 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 6, which allows the operator to set the parameters or initiate the operation of the laser scanner 32. For example, the screen 66 may have a user interface that allows the operator to provide measurement instructions to the device, and the screen may also display measurement results. In addition, in one embodiment the display device 64 can display the messages retrieved from the fixed error database 114.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the controller 62 represents one or more processors distributed throughout the scanner 32 or external to the scanner 32 to execute scan processing software instructions to facilitate performing the functions described herein. In an embodiment, the controller 62 calculates digital security attributes (e.g., hash codes) and optionally signs them as described herein. The one or more processor may include one or more computing devices connected for communications via a network. The computing devices may be arranged in a distributed arrangement to operate cooperatively to process data from the scanner 32. The processors may be microprocessors, field programmable gate arrays (FPGAs), digital signal processors (DSPs), and generally any device capable of performing scan processing software computing functions. The one or more processors have access to memory (volatile or nonvolatile) for storing information. In addition, one or more of the processors of the controller 62 may provide support for remote computing capability. Communication between the processors may be through a wired, wireless, or a combination of wired and wireless data connection or medium.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44.

An auxiliary image acquisition device 88 may be a device that captures and measures a parameter associated with the scanned volume or the scanned object and provides a signal representing the measured quantities over an image acquisition area. The auxiliary image acquisition device 88 may be, but is not limited to, a color camera, pyrometer, a thermal imager, an ionizing radiation detector, or a millimeter-wave detector.

In an embodiment, a camera (first image acquisition device) 90 is located internally to the scanner 32 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50. The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

It should be appreciated that while embodiments herein describe a coordinate measurement device in reference to laser scanner 32, this is for exemplary purposes and the claims should not be so limited. In other embodiments, the scan processing software may be executed on, or receive data from, any coordinate measurement device capable of measuring and determining 3D coordinates of an object or the environment. The coordinate measurement device may be, but is not limited to: an articulated arm coordinate measurement machine, a laser tracker, an image scanner, a photogrammetry device, a triangulation scanner, a laser line probe, or a structured light scanner for example.

It is understood in advance that although this disclosure describes providing secure data in 3D software applications in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 8:
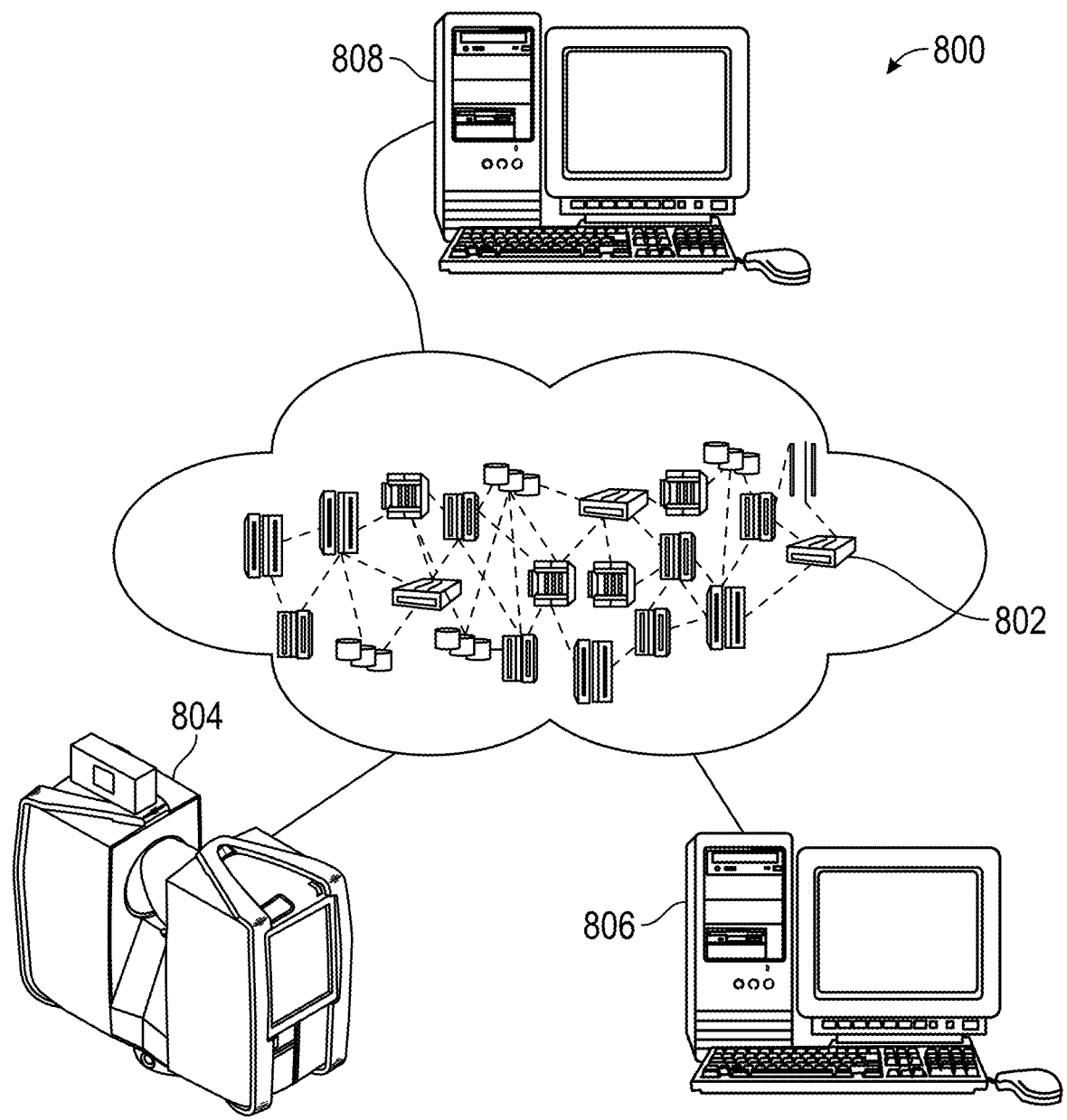
FIG. 8 is a schematic illustration of a cloud computing environment in accordance with one or more embodiments of the present invention.

Referring now to FIG. 8, an illustrative cloud computing environment 800 is depicted. As shown, cloud computing environment 800 comprises one or more cloud computing nodes 802 with which local computing devices used by cloud consumers, such as, for example, coordinate measurement device 804 and computers 806 808 may communicate. In an embodiment, providing secure data in 3D software applications is performed through the cooperation of computer 808 or 806, and the coordinate measurement device 804. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-808 shown in FIG. 8 are intended to be illustrative only and that computing nodes 802 and cloud computing environment 800 can communicate with any type of computerized device over any type of network and/or network addressable connection (e.g., using a web browser).

Figure 9:
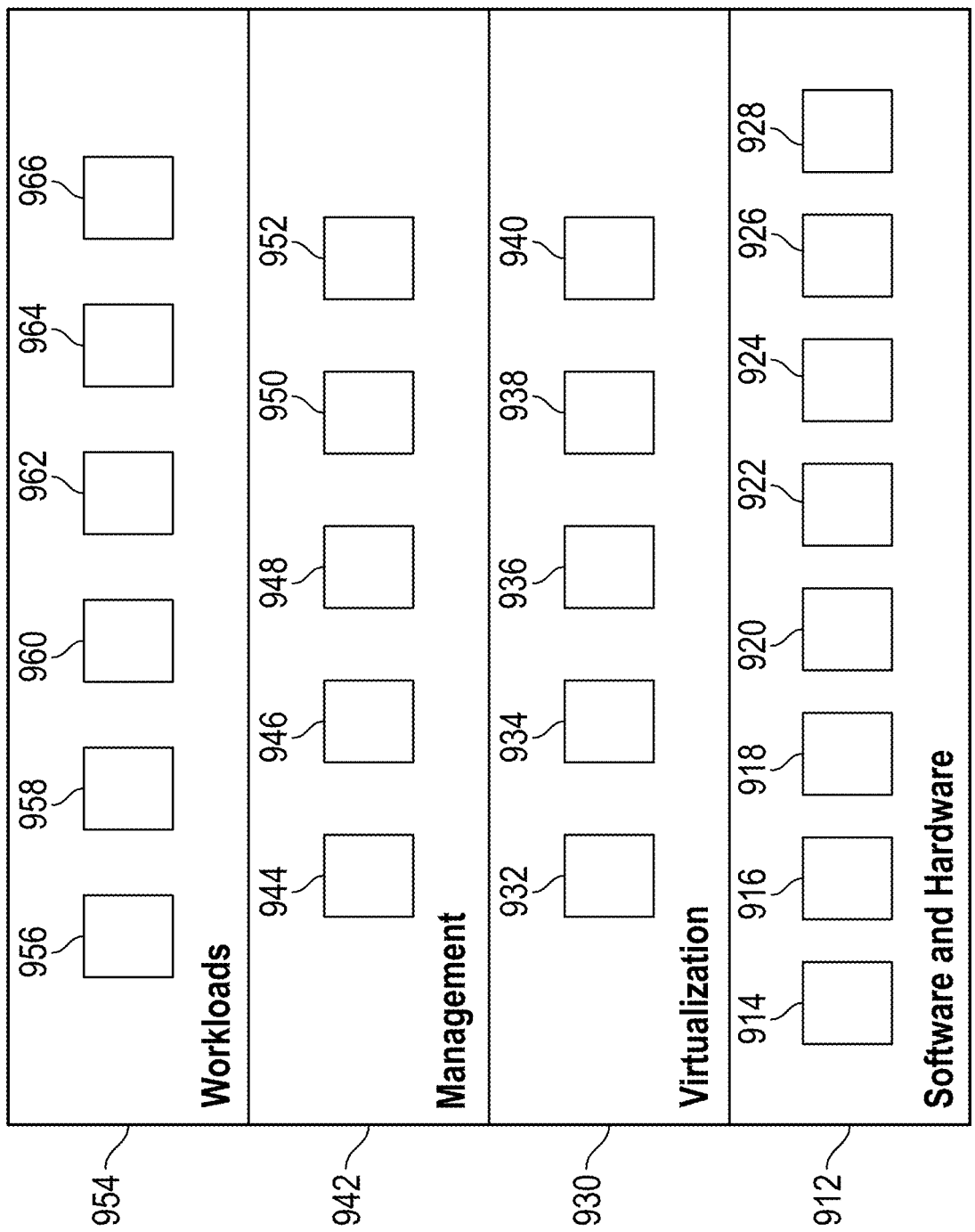
FIG. 9 is a schematic illustration of an abstraction model layers in accordance with one or more embodiments of the present invention.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided: hardware and software layer 912 includes hardware and software components. Examples of hardware components include, but are not limited to: mainframes 914; desktop computer workstations; laptops; tablets; mobile telephones; RISC (Reduced Instruction Set Computer) architecture based servers 916; servers 918; blade servers 920; storage devices 922; and networks and networking components 924. In some embodiments hardware components are imbedded or integrated into measurement or digital asset collections system. In some embodiments, software components include network application server software 926, and database software 928; virtualization layer 930 provides an abstraction layer from which the following examples of virtual entities may be provided: virtual servers 932; virtual storage 934; virtual networks 936, including virtual private networks; virtual applications and operating systems 938; and virtual clients 940.

In one example, management layer 942 may provide the functions described below. Resource provisioning 944 provides dynamic procurement of computing resources and other resources that are utilized to perform tasks within the cloud computing environment. Metering and pricing 946 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 948 provides access to the cloud computing environment for consumers and system administrators. Service level management 950 provides cloud computing resource allocation and management such that required service levels are met. Service Level Agreement (SLA) planning and fulfillment 952 provides pre-arrangement for, and procurement of, cloud computing resources for which a future requirement is anticipated in accordance with an SLA.

Workloads layer 954 provides examples of functionality for which the cloud computing environment may be utilized. Examples of workloads and functions which may be provided from this layer include: mapping and navigation 956; software development and lifecycle management 958; transaction processing 960; scan processing software 962; point cloud to virtual reality data processing 964; and user defined content to point cloud processing 966.

Figure 10:
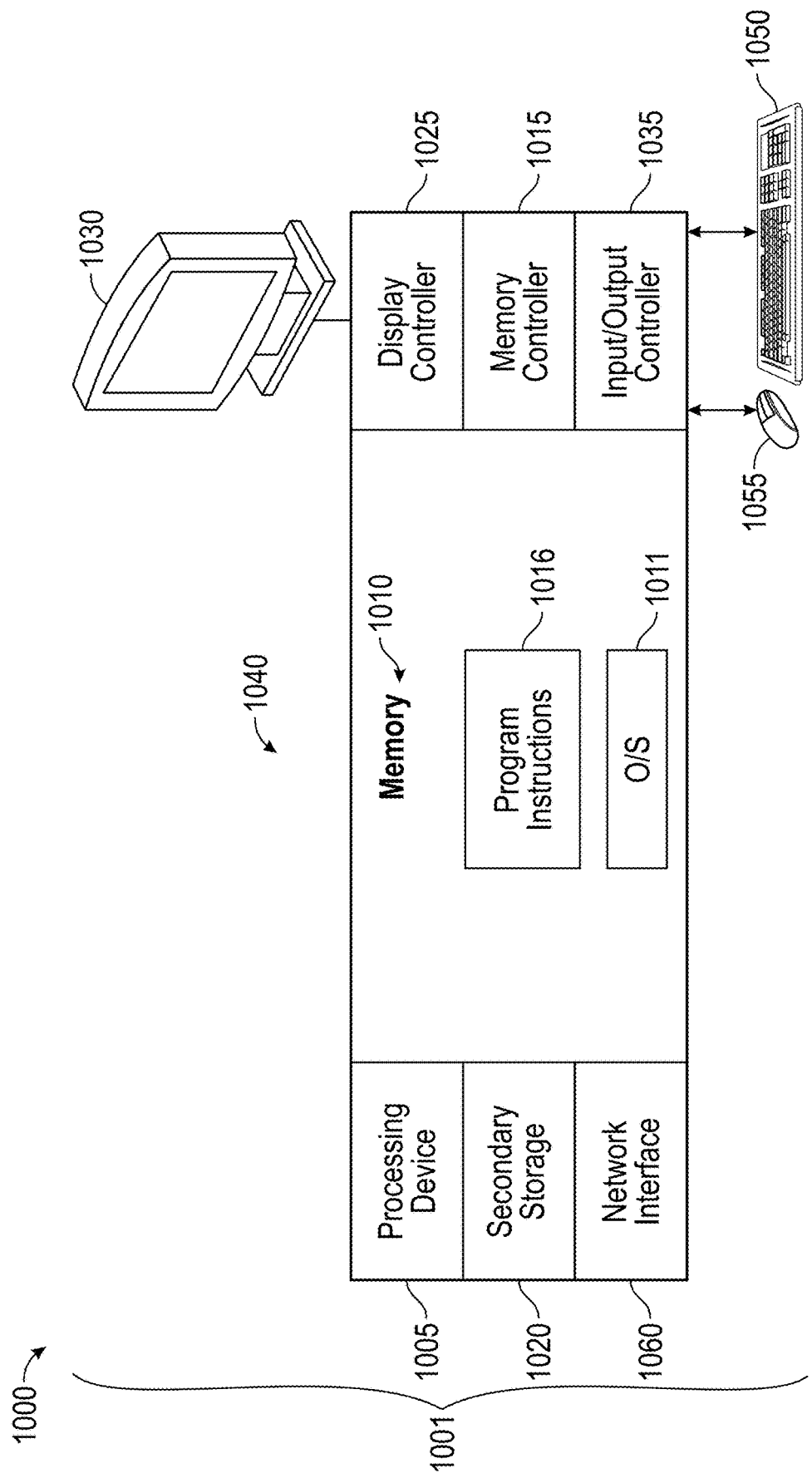
FIG. 10 is a schematic illustration of a computer system in accordance with one or more embodiments of the present invention.

Turning now to FIG. 10, a schematic illustration of a system 1000 is depicted upon which aspects of one or more embodiments of providing secure data in 3D software applications may be implemented. In an embodiment, all or a portion of the system 1000 may be incorporated into one or more of the 3D scanner device and processors described herein. In one or more exemplary embodiments, in terms of hardware architecture, as shown in FIG. 10, the computer 1001 includes a processing device 1005 and a memory 1010 coupled to a memory controller 1015 and an input/output controller 1035. The input/output controller 1035 can be, for example, but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the computer 1001 may include address, control, and/or data connections to enable appropriate communications among the aforementioned components.

In one or more exemplary embodiments, a keyboard 1050 and mouse 1055 or similar devices can be coupled to the input/output controller 1035. Alternatively, input may be received via a touch-sensitive or motion sensitive interface (not depicted). The computer 1001 can further include a display controller 1025 coupled to a display 1030.

The processing device 1005 is a hardware device for executing software, particularly software stored in secondary storage 1020 or memory 1010. The processing device 1005 can be any custom made or commercially available computer processor, a central processing unit (CPU), an auxiliary processor among several processors associated with the computer 1001, a semiconductor-based microprocessor (in the form of a microchip or chip set), a macroprocessor, or generally any device for executing instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 1010 may incorporate electronic, magnetic, optical, and/or other types of storage media. Accordingly, the memory 1010 is an example of a tangible computer readable storage medium 1040 upon which instructions executable by the processing device 1005 may be embodied as a computer program product. The memory 1010 can have a distributed architecture, where various components are situated remote from one another, but can be accessed by the processing device 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011 and program instructions 1016. The operating system 1011 essentially controls the execution of other computer programs and provides scheduling, input-output control, file and data management, memory management, and communication control and related services. When the computer 1001 is in operation, the processing device 1005 is configured to execute instructions stored within the memory 1010, to communicate data to and from the memory 1010, and to generally control operations of the computer 1001 pursuant to the instructions. Examples of program instructions 1016 can include instructions to implement the processing described herein in reference to FIGS. 1-9.

The computer 1001 of FIG. 10 also includes a network interface 1060 that can establish communication channels with one or more other computer systems via one or more network links. The network interface 1060 can support wired and/or wireless communication protocols known in the art. For example, when embodied in a user system, the network interface 1060 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, digital CPU devices, GPU devices, computing devices, microcontrollers, digital signal processors (DSPs), field programmable gate arrays (FPGAs), or like devices, as further described herein. A CPU typically performs a variety of tasks while a GPU is optimized to display or process images and/or 3D datasets.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A method for providing secure data, the method comprising:
    receiving a request from a requestor to access a data file in a set of scan data files, the data files in the set of scan data files comprising a binary file including sensor data acquired by a three-dimensional (3D) coordinate measurement device and a text file including scan metadata, wherein names and expected digital security attributes of each of the data files in the set of scan data files are located in a digest file that is signed by the coordinate measurement device using a private key included in firmware of the measurement device;
    retrieving the data file; and
    authenticating content of the data file, the authenticating comprising:
        validating the signature of the digest file;
        retrieving, from the digest file, an expected digital security attribute of the data file, the expected digital security attribute previously calculated by a digital security function based on content of the data file prior to the data file being retrieved;
        applying the digital security function to the data file to calculate an actual digital security attribute;
        comparing the expected digital security attribute to the actual digital security attribute;
        based at least in part on the expected security attribute matching the actual security attribute, assigning a value of valid to an output of the authenticating; and
        based at least in part on the expected security attribute not matching the actual security attribute, assigning a value of not valid to the output of the authenticating.

2. The method of claim 1, wherein the authenticating further comprises recording the request from the requestor to access the data file.

3. The method of claim 1, wherein the digital security attribute is a hash code and the digital security function is a hash function.

4. The method of claim 1, further comprising, based on the output of the authenticating having a value of valid, utilizing the data file in an investigative process or a trial preparation process.

5. The method of claim 1, wherein the data file comprises sensor data and the method further comprises acquiring the sensor data, the acquiring comprising:
    collecting, by the coordinate measurement device, the sensor data;
    applying the digital security function to the sensor data to calculate the expected digital security attribute.

6. The method of claim 1, wherein the data file comprises sensor data and the method further comprises acquiring the sensor data, the acquiring comprising:
    collecting, by the coordinate measurement device, the sensor data;
    applying the digital security function to the sensor data and utilizing one or more unique attribute(s) of the coordinate measurement device to calculate an initial digital security attribute.

7. The method of claim 1, further comprising providing the requestor access to the data file based on the output of the authenticating having a value of valid.

8. The method of claim 1, further comprising communicating the value of the output of the authenticating to the requestor.

9. The method of claim 1, further comprising based on the output of the authenticating having a value of invalid, communicating the value of the output of the authenticating to a third party.

10. The method of claim 1, further comprising preventing the requestor from accessing the data file based on the output of the authenticating having a value of not valid.

11. The method of claim 1, further comprising recording the request to access the data file and the output of the authenticating in a log.

12. The method of claim 11, wherein content of the log provides a chain of custody of the data file.

13. The method of claim 11, further comprising outputting content of the log as evidence that data in the data file is authentic.

14. The method of claim 1, wherein the expected digital security attribute is encrypted.

15. The method of claim 1, wherein the data file and the digital security attribute are stored in different storage devices.

16. The method of claim 1, wherein the authenticating is automatically performed by a backend process based on detecting that the data file has been retrieved.

17. The method of claim 1, wherein the authenticating is automatically performed by a backend process based on receiving the request from the requestor to access the data file.

18. The method of claim 1, wherein the data file documents a crime scene or an accident scene.

19. A system for providing secure data, the system comprising:
  a memory having computer readable instructions; and
  one or more processors for executing the computer readable instructions, the computer readable instructions including:
    receiving a request from a requestor to access a data file in a set of scan data files, the data files in the set of scan data files comprising a binary file including sensor data acquired by a three-dimensional (3D) coordinate measurement device and a text file including scan metadata, wherein names and expected digital security attributes of each of the data files in the set of scan data files are located in a digest file that is signed by the coordinate measurement device using a private key included in firmware of the measurement device;
    retrieving the data file; and
    authenticating content of the data file, the authenticating comprising:
      validating the signature of the digest file;
      retrieving, from the digest file, an expected digital security attribute of the data file, the expected digital security attribute previously calculated by a digital security function based on content of the data file prior to the data file being retrieved;
      applying the digital security function to the data file to calculate an actual digital security attribute;
      comparing the expected digital security attribute to the actual digital security attribute;
      based at least in part on the expected security attribute matching the actual security attribute, assigning a value of valid to an output of the authenticating; and
      based at least in part on the expected security attribute not matching the actual security attribute, assigning a value of not valid to the output of the authenticating.

20. The system of claim 19, wherein the authenticating further comprises recording the request from the requestor to access the data file.

21. The system of claim 19, wherein the digital security attribute is a hash code and the digital security function is a hash function.

22. The system of claim 19, wherein the computer readable instructions further include, based on the output of the authenticating having a value of valid, utilizing the data file in an investigative process or a trial preparation process.

23. The system of claim 19, wherein the scan file comprises sensor data and the computer readable instructions further include acquiring the sensor data, the acquiring comprising:
  collecting, by the coordinate measurement device, the sensor data;
  applying the digital security function to the sensor data to calculate the expected digital security attribute.

24. The system of claim 19, wherein the scan file comprises sensor data and the method further comprises acquiring the sensor data, the acquiring comprising:
  collecting, by the coordinate measurement device, the sensor data;
  applying the digital security function to the sensor data and to a unique attribute of the coordinate measurement device to calculate an initial digital security attribute.

25. The system of claim 19 wherein the computer readable instructions further include preventing the requestor from accessing the data file based on the output of the authenticating having a value of not valid.

26. The system of claim 19, wherein the computer readable instructions further include recording the request to access the data file and the output of the authenticating in a log.

27. The system of claim 26, wherein content of the log provides a chain of custody of the data file.

28. The system of claim 26, wherein the computer readable instructions further include outputting content of the log as evidence that content of the data file is authentic.

29. The system of claim 19, wherein the authenticating is automatically performed by a backend process based on detecting that the data file has been retrieved.

30. The system of claim 19, wherein the authenticating is automatically performed by a backend process based on receiving the request from the requestor to access the data file.

31. A method for tracking a digital asset, the method comprising:
  receiving a set of scan data files, the data files in the set of scan data files comprising a binary file including sensor data acquired by a three-dimensional (3D) coordinate measurement device and a text file including scan metadata, wherein names and expected digital security attributes of each of the data files in the set of scan data files are located in a digest file that is signed by the coordinate measurement device using a private key included in firmware of the measurement device;
  providing a chain of custody for the set of scan files; and
  outputting the chain of custody for the set of scan files to an authorized requestor.

32. The method of claim 31, further comprising recreating a version of a data file in the set of scan data files at a selected point in time based at least in part on contents of the chain of custody.

33. The method of claim 31, wherein the providing a chain of custody comprises:
- recording movement of the set of scan data files from one device to another, the recording movement of the set of scan data files comprising storing a time stamp of a time of the movement, storing an identifier of a person or process initiating the movement, and storing an identifier of a device storing the set of scan data files after the movement;
- recording attempts to access the set of scan data files, the recording attempts to access comprising storing a time stamp of a time of an access attempt, storing an identifier of a person or process initiating the access attempt, and storing a result of the authenticating;
- recording updates to content of the set of scan data files, the recording updates comprising storing a time stamp of a time of an update, storing an identifier of a person or process initiating the update, and storing a copy of the set of scan data files after the update.

34. The method of claim 31, wherein attempts to access the set of scan data files comprise an authentication process that authenticates content of the set of scan data files based at least in part on a digital security attribute and a digital security function.

35. The method of claim 34, wherein the digital security attribute is a hash code and the digital security function is a hash function.

* * * * *